July 18, 1967  T. ORNAS, JR., ETAL  3,331,089
SEAT CONSTRUCTION
Filed April 14, 1965  2 Sheets-Sheet 1
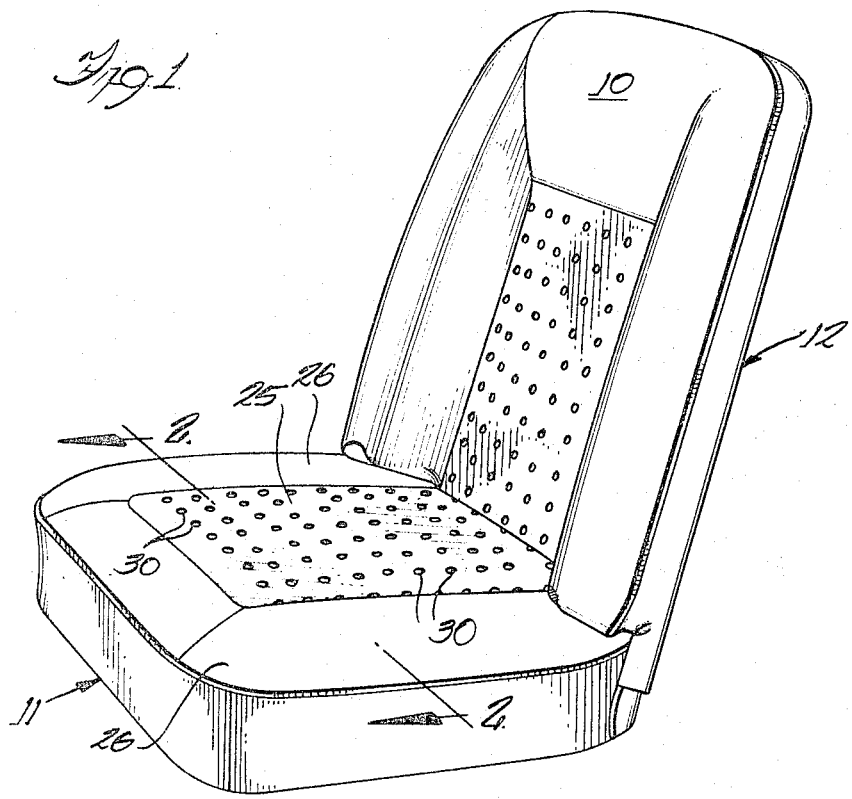
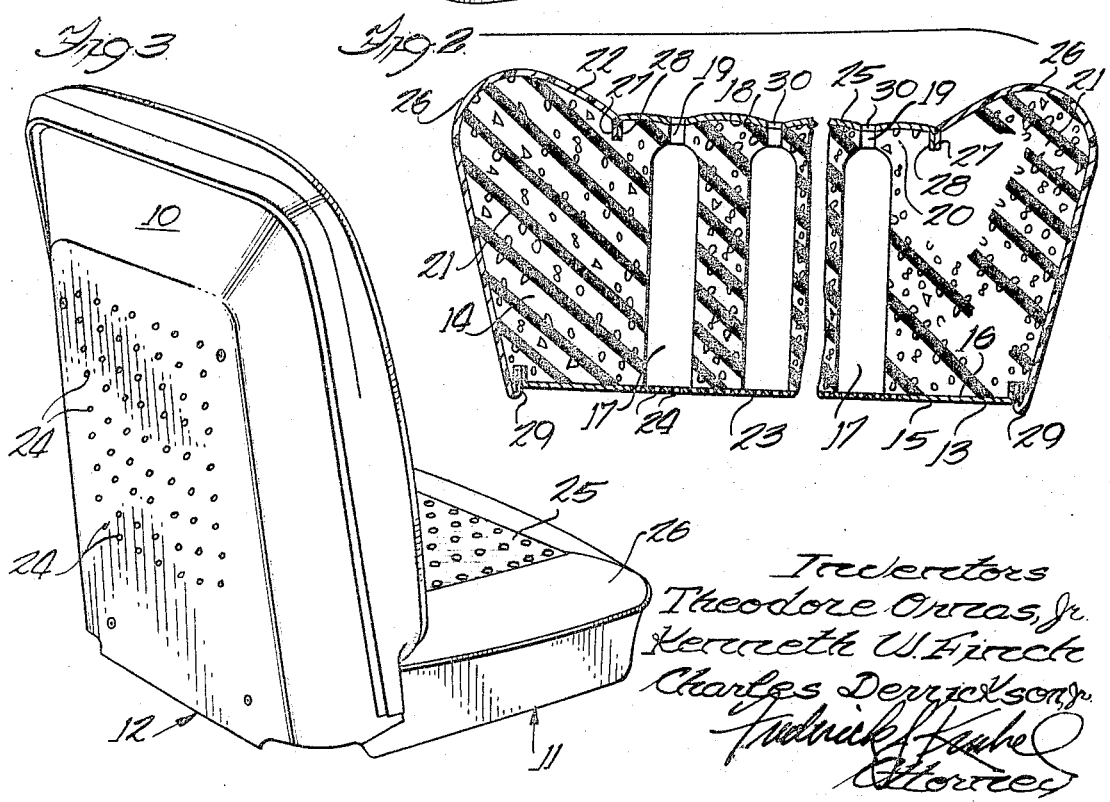
Inventors
Theodore Ornas, Jr.
Kenneth W. Fireck
Charles Derrickson, Jr.
Attorneys

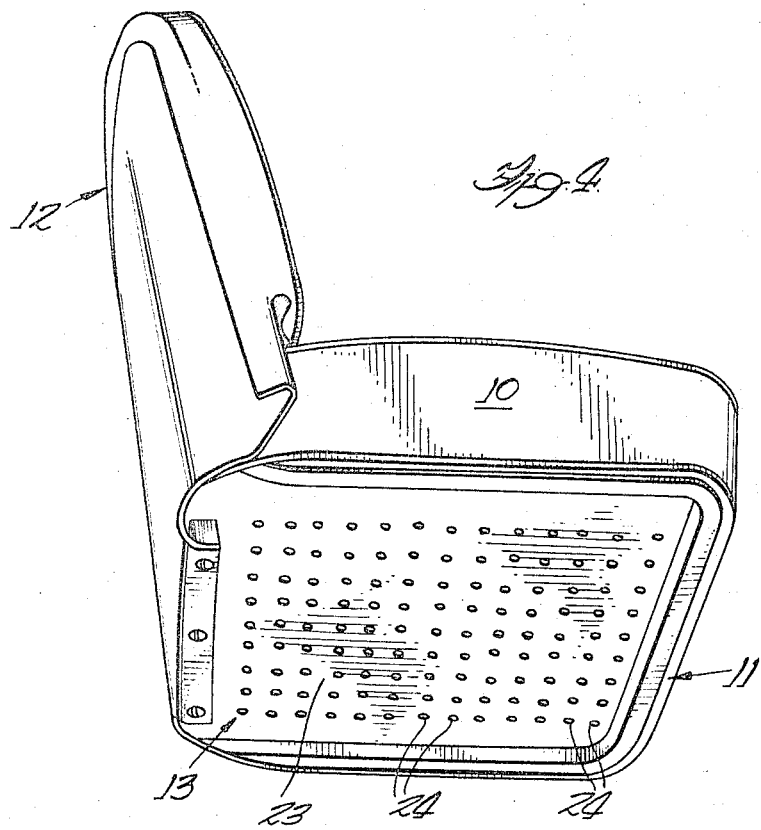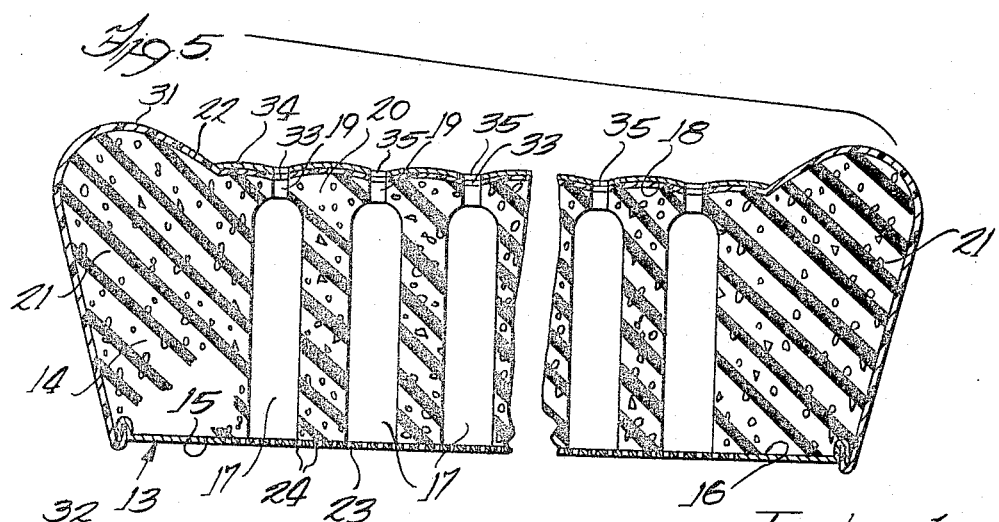

3,331,089
SEAT CONSTRUCTION
Theodore Ornas, Jr., Kenneth W. Finch, and Charles Derrickson, Jr., Fort Wayne, Ind., assignors to International Harvester Company, Chicago, Ill., a corporation of Delaware
Filed Apr. 14, 1965, Ser. No. 448,125
4 Claims. (Cl. 5—347)

This invention relates to a seat construction, and more particularly to a new and improved motor vehicle seat construction embodying ventilating means for circulating air under positive pressure through the seat and back cushions and across the body surfaces contacting the seat and back cushions of the person seated upon the seat construction.

It is well known that the utility of a seat structure is dependent upon several design factors. The seat structure must, inter alia, be capable of firmly yet comfortably supporting the seat and back of the user. The problem of providing a seat structure for use in motor vehicles in comparison to the problem encountered in the design of relatively stationary seat structures is more complex inasmuch as the user is oftentimes requerid to remain seated on the seat structure for long, uninterrupted periods of time. The bottom and back cushions of motor vehicle seat structures should be effective to absorb the jarring and shock resulting from riding over rough roads or road surface irregularities and should embody means for adequately ventilating the surface portions of the body of the user in contact with the seat structures. It is well known that the degree of comfort afforded the user is enhanced if the body surface portions engaging the seat bottom and back cushions are adequately ventilated. Heretofore many different proposals have been made and actually embodied into structures to solve the above and other design problems confronting a vehicle seat designer but such proposals and seat structures have generally resulted in seat constructions that either failed to solve the design problems efficiently or involved costly and sometimes ineffective and impractical means for adequately ventilating the seat and back cushions and the body surface portions of the person bearing against the cushions. It is, therefore, one of the primary objectives of the present invention to obviate the various shortcomings, as briefly outlined above, of prior vehicle seat constructions by providing a motor vehicle seat construction having ample cushioning properties to firmly yet comfortably support the body of the user and to effectively absorb the jarring and shock of riding over rough and uneven terrain, and which motor vehicle seat construction incorporates a novel and relatively inexpensive means for circulating air through the back rest and bottom cushions and across the body surface portion of the user contacting the back and bottom cushions.

A still further objective of the present invention is to utilize molded foam rubber or polyether in the formation of the back rest and bottom cushions and to incorporate novel means for circulating air through such seat cushions and across the surfaces thereof adapted to be engaged by body surface portions of the user.

A still further object is to provide "pump means" for discharging air under a positive pressure from the interior of the back rest and bottom cushions to the surface thereof normally engaged by body surface portions of a person utilizing the seat construction.

A still further object is to fabricate a back rest cushion and/or a bottom cushion made of molded compressible foam rubber or polyether or the like for a vehicle seat construction in such a manner that it cooperates with its supporting or back-up member to, in effect, provide a plurality of air pumps for directing air under pressure to a surface of the cushion which are actuated by alternate compression and expansion of the cushions as the body of the person seated upon the seat construction is shifted with respect thereto during operation of the vehicle causing alternate compression and expansion of the cushions.

Still another object is to provide a relatively lightweight and inexpensively manufactured motor vehicle seat construction designed so that there is a relatively free circulation of air therethrough at all times and wherein the seat construction is durable, comfortable and attractive in appearance.

The foregoing and other important objects and desirable features inherent in and encompassed by the invention, together with many of the purposes and uses thereof, will become readily apparent from a reading of the ensuing description in conjunction with the annexed drawings, in which:

FIGURE 1 is a perspective view of a motor vehicle seat construction embodying the invention;

FIGURE 2 is a vertical sectional view taken substantially along the line 2—2 of FIGURE 1;

FIGURE 3 is another perspective view of the vehicle seat illustrated in FIGURE 1;

FIGURE 4 is still another perspective view disclosing the bottom of the vehicle seat construction; and FIGURE 5 is a vertical sectional view similar to FIGURE 2 illustrating a modified embodiment of the invention.

Referring to the drawings in detail, wherein like reference characters represent like elements throughout the various views, a seat construction, designated generally by reference character 10, is illustrated. At the outset, it is to be understood that while the seat construction 10 to be described in detail possesses certain unique features which make it highly advantageous to use in conjunction with motor vehicles, the same construction can also be advantageously employed in other environments without departing from the spirit and scope of the invention. The seat construction 10 includes a horizontally disposed bottom section 11 which is adapted to be suitably connected to the floor panel (not shown) of the motor vehicle and a back seat rest section 12. Conventional means may be employed for operatively connecting the lower end of the back rest section 12 to the rearwardly disposed end of the bottom section 11.

Referring specifically to FIGURES 2 and 4, the seat bottom section 11 includes a relatively thin, rigid base pan 13 which is preferably made of metal. The base pan 13 serves as a support for a bottom cushion 14. The bottom cushion 14 is preferably made and shaped by molding conventional foam rubber or polyether. As clearly illustrated in FIGURE 2, the bottom face 15 of the molded foam rubber or polyether bottom cushion 14 abuts the uppermost surface 16 of the base pan 13 and is immovable with respect thereto. It will be noted that the molded foam rubber or polyether bottom cushion 14 is cored so as to provide a plurality of elongated cylindrical recesses 17 which open into and extend from the bottom face 15 to points adjacent to but vertically spaced below the uppermost surface 18 thereof. It is to be understood that the term "recess" or "recesses" as used hereinafter are employed to denote the cylindrical surface or surfaces defining a space or spaces and not to the space or spaces per se. Associated with each cylindrical recess 17 generally circular opening 19 of considerably smaller diameter than the diameter of the cylindrical recess 17. Each opening 19 is formed through the uppermost uncored layer portion 20 of cushion material to provide fluid communication between a respective cylindrical recess 17 and the exterior side of the uppermost surface 18 of the foam rubber cushion or polyether 14. The cylindrical recesses 17 and their associated coaxially disposed axially aligned cylindrical openings 19 are arranged in a plurality of longitudinally spaced and parallel rows. Each row comprises a plurality of transversely spaced and aligned recesses 17 and opening 19 whereby each recess 17 and its associated opening 19 is longitudinally spaced from and is substantially in longitudinal alignment with a respective recess 17 and cylindrical opening 19 of the adjacent row. Each row of recesses 17 and openings 19 is longitudinally spaced a predetermined uniform amount from the row or rows adjacent thereto. Each recess 17 and its associated cylindrical opening 19 of any one row is in transverse alignment with and is transversely spaced a uniform predetermined distance from the recesses 17 and cylindrical opening 19 adjacent thereto. As best shown in FIGURE 2, the transverse sides of the bottom cushion 14 are defined by uncored, enlarged side portions 21, the forward ends of which are integrally formed with a transversely extending uncored, enlarged forward portion. The side portions 21 and the forward portion are somewhat thicker than the cored area of the bottom cushion 14 and thus the uppermost surface portions 22 of the transverse enlarged side portions 21 and the uppermost surface portion of the forward enlarged portion are curved and extend upwardly from the uppermost surface 18 of the bottom cushion 14. From the foregoing, it will be appreciated that the corded area of the bottom cushion 14 extends longitudinally substantially from the rearwardmost end thereof to the enlarged forward portion and transversely between the enlarged side portions 21 and such enlarged side portions 21 and such enlarged side and forward portions, in effect, provide a raised rim, which appears substantially U-shaped in plan, above the normal uncompressed level of the uppermost surface 18 of the bottom cushion 14. From the foregoing, it will be appreciated that the cushion construction described thus far adds considerably to the overall comfort afforded thereby to a user since the side and front marginal edges of the bottom cushion 14 are not weakened by any coring and, furthermore, the raised rim of the side portions 21 partially embrace and firmly support the upper leg, outer side portions of a person seated upon the bottom cushion 14 and the forward portion, on the other hand, engages and firmly supports the underside of the leg portions adjacent the knee joints.

As best shown in FIGURES 2 and 4, an area 23 of the metal base pan 13 abutting the cord area portion of the cushion bottom face 15 is provided with a plurality of relatively small circular apertures 24 therethrough. While the number of apertures 24 exceeds the number of cylindrical recesses 17 corded in the bottom cushion 14, the total area of the apertures 24 is considerably less than the total area of the openings 19 extending between the recesses 17 in the uppermost surface 18 of the bottom cushion 14. The purpose of the apertures 24 will be pointed out presently.

From the foregoing, it will be apperciated that the cylindrical openings 19 provide fluid communication between the elongated cylindrical recesses 17 and the uppermost surface 18 of the bottom cushion 14 and, similarly, the minute apertures 24 provide fluid communication between the elongated cylindrical recesses 17 and the underside of the base pan 13. However, fluid communication between the underside of the base pan 13 and the elongated cylindrical recesses 17 is restricted in comparison with the freedom of flow existing between the cylindrical recesses 17 and the uppermost surface 18 of the cushion 14 which freedom of flow is afforded by the relatively large cylindrical openings 19.

In the embodiment of the invention illustrated in FIGURE 2, the exposed top, side, back and front portions of the bottom cushion 14 are covered by means of a covering or layer 25 of woven material and a fabricated strip 26 of "Hypalon" or similar synthetic rubber-like material. (The word "Hypalon" is a trademark of E. I. DuPont de Nemours & Co. Inc., for synthetic rubber made from chlorosulfonated polyethylene.) The layer of woven material 25, which may be nylon, rayon, cotton or other fabric, is preferably co-extensive with and bonded directly to the uppermost surface 18 of the bottom cushion 14 in any well-known manner and employing conventional bonding means. The fabric layer 25 is tightly stretched on the uppermost surface 18 and since the uppermost surface 18 of the cushion 14 is substantially rectangular in plan the layer 25 of woven fabric material is also substantially rectangular in plan. The outer marginal edge portions 27 of the woven fabric layer 25 are folded downwardly and are disposed in a shallow groove defining the side, front and rear marginal limitations of the uppermost surface 18 of the bottom cushion 14. The inner marginal edge portions 28 of the synthetic rubber strip 26 are also folded downwardly and are also disposed within the shallow groove. The strip 26 is preferably fabricated from a number of individual pieces and, when assembled, has a substantially U-shape in plan. The downwardly turned, inner marginal edge portions 28 are sewn or bonded to the outer marginal edge portions 27 of the fabric layer 25 and the edge portions 27 of the fabric layer 25 and the edge portions 27 and 28 are secured in the shallow groove. The lowermost edge portions 29 of the fabricated synthetic rubber strip 26 are suitably secured to the metal base pan 13 in any well-known manner. From the foregoing it will be appreciated that the fabricated, relatively stiff and hard-wearing "Hypalon" strip 26 covers the sides, back and front surfaces, the uppermost surface portions 22 of the enlarged side portions 21, and the uppermost surface portion of the enlarged forward portion of the bottom cushion 14.

While the construction of the back rest section 12 will not be described in detail, it is to be understood that it is constructed in exactly the same manner as described above with reference to the construction of the bottom section 11 with the exception that it is modified slightly insofar as is necessary to adapt it for use as a back rest to be leaned against instead of a seat bottom section to be sat upon. It is also to be understood that the back seat section 12 functions in exactly the same manner as the seat bottom section 11, which will be described presently.

Referring once again to FIGURE 2 it will be noted that the woven fabric layer 25 is provided with a plurality of circular apertures 30 therethrough, each of which is coaxial with and of the same diameter as a respective circular opening 19. From the foregoing, it will be appreciated that by virtue of the construction of the bottom section 11, described above, and the back rest section 12 air is permitted to freely circulate through the seat bottom cushion 14 and the back rest cushion (not shown) simply because the apertures 30, openings 19, cylindrical recesses 17 and apertures 24, in effect form, a multitude of passageways for the free circulation of air between the body surface portions of the person bearing against the back rest section 12 and seated upon the bottom section 11 and the atmosphere. It will also be appreciated that the fabric covering or layers 25 not only possess the desired characteristics of being flexible and of being somewhat porous whereby any moisture on the clothing of the person seated thereupon will be absorbed so as to enhance the comfort feature of the seat construction 10 but also render the appearance of the seat sections 11 and 12 attractive. The synthetic rubber strip 26, on the other hand, while not as flexible as the fabric layer 25, is still somewhat flexible and is disposed in areas where its properties of resisting abrasion and stains and the like are best utilized.

As stated hereinbefore the cushions of the seat bottom section 11 and back seat section 12 are preferably constructed of foam rubber material and the density of such foam rubber material is chosen to have a compressibility factor of a sufficient magnitude to enable the back rest section 12 and seat bottom section 11 to adjust readily to the contour of those parts of the body of the person seated upon the seat construction 10 and possesses the necessary resiliency to enable the cushions to return to their original distended or expanded forms, as illustrated in FIGURE 1, when pressure is not being applied thereto by the body of a person. It is to be understood that the degree of compressibility possessed by the cushions is sufficiently high to firmly but yieldably support the body of the person seated thereupon while maintaining their essential forms throughout the range of loads to which the seat construction 10 may be subjected in normal use.

From the foregoing it will be appreciated that when one sits on the seat bottom section 11 and leans against the back rest section 12, both the bottom cushion 14 and the back rest cushion 12 are compressed an amount depending upon the magnitude of the pressure applied thereto.

Furthermore, during operation of the motor vehicle both the bottom cushion 14 and back rest cushion are continuously compressed and expanded, the frequency of such compression and expansion and the magnitude thereof depends upon the roughness of the road bed the vehicle is traversing and the user of the seat shifts his position thereon.

Referring to FIGURE 2 it will be appreciated that when the seat construction 10 is not being used and the bottom cushion 14 and the back rest are in their fully expanded free state, all of the cylindrical recesses 17 would appear as illustrated. Air is permitted to freely circulate through the bottom cushion 14 and back rest cushion through the openings 24 cylindrical recesses 17 and the cylindrical openings 19 and apertures 30. When the bottom cushion 14 and back seat cushion are compressed as when a person seats himself upon the seat construction 10 the uncord layer portion 20 of the bottom cushion 14 approaches the base pan 13 and in a similar manner an uncord layer portion (not shown) of the back rest cushion approaches the rigid panel of the back rest section 12. When such compression of the bottom cushion 14 and back rest cushion occurs the volume of each cylindrical recess 17 becomes smaller. Each cylindrical recess 17 decreasing in volume is dependent upon the magnitude of pressure exerted on the uncord layer portion 20 directly in alignment therewith. Inasmuch as the volumetric capacity of each cylindrical recess 17 is decreased to a certain degree during compression as the bottom cushion 14 and back rest cushion are being depressed some of the air contained within such cylindrical recess 17 is forced under pressure therefrom and such air will be discharged from the interior of the bottom cushion 14 and back rest cushion through the paths of least resistance. Inasmuch as the cylindrical opening 19 and the aperture in alignment therewith providing fluid communication between each cylindrical recess and the exterior of the seat construction 10 have an area considerably greater than the area of the apertures 24 in communication with such cylindrical recess for providing fluid communication between such cylindrical recess 17 and the atmosphere, the vast majority of the air discharged from the cylindrical recess upon compression of the back rest and bottom cushions will pass through the openings 19 and apertures 30 under pressure. As the pressure is reduced or relieved from the back rest cushion and bottom cushion 14, the cushions will expand and consequently air is drawn into the cylindrical recesses 17 through the apertures 24 formed through the base pan 13 and the back rest supporting pan. Thus, it will be appreciated that each cylindrical recess 17 functions as an air pump means and the cylindrical recess 19 and the aperture 30 associated therewith serve as the outlet or discharge means for such pump means while the apertures 24 serve as an air inlet means for the pump means. From the foregoing, it will be appreciated that the greater the frequency of compression and expansion of the bottom cushion 14 and back rest cushion and the greater the extent of such compression, the greater will be the volume and pressure of air circulated under positive pressure over the body surfaces of the user engaging the seat construction 10.

In the embodiment of the invention illustrated in FIGURES 4 and 5 the bottom section 11 and back rest section 12 are constructed in exactly the same manner and made of the same materials as the bottom section 11 and back rest section 12 illustrated in FIGURES 1, 2 and 3 with the exception of the fabric material and the means employed for fastening such fabric material to the exterior surfaces of the bottom cushion 14 and the back seat cushion.

Referring to FIGURE 5 the outer covering of the bottom cushion 14 comprises a single sheet of vinyl plastic material 31 which has its lowermost marginal edges secured to the base pan 13 as indicated by reference character 32 in any suitable manner. The vinyl plastic 31 is also cemented or otherwise secured to the outermost surface 22 and 18 of the bottom cushion 14. The portion of the vinyl plastic cover 31 extending between the uppermost raised surface portions 22 is provided with a plurality of circular openings 33 therethrough. Each circular aperture 33 is in axial alignment with a respective cylindrical opening 19 formed through the uncord layer portion 20 of the bottom cushion 14. A layer 34 of woven fabric material is in turn cemented or otherwise adhesively secured to the uppermost surface of the vinyl cover 31 disposed between the enlarged side portions 21 and the forward raised portion. The woven fabric layer 34 is also provided with a plurality of circular apertures 35 therethrough, each of which is in axial alignment with a respective circular aperture 33 formed in the vinyl plastic cover 31. While not shown in detail it is to be understood that the back rest cushion is covered in exactly the same manner as the bottom cushion 14. It is also to be understood that the modification of the invention illustrated in FIGURE 5 functions in exactly the same manner as the modification of the invention illustrated in FIGURE 1 to permit circulation of air through the back rest and bottom cushions 14 and also functions to force air out of the cushions under a positive pressure automatically during use of the seat construction 10. Thus when a person is seated upon the seat construction 10 and leans against the back seat section 12 air may circulate freely through the bottom section 11 and back rest section 12 and may enter the bottom of the base pan 13 and the back of the back rest support pan and leave at the top and front of the bottom cushion 14 and back rest cushion respectively under a slight positive pressure adjacent in the body surface areas contacting the bottom section 11 and back rest section 12 so as to enhance the comfort of such user of the seat. In both embodiments of the invention when the passenger or user of the seat construction 10 shifts from side to side and moves vertically upon the seat construction 10 portions of the bottom cushion 14 and the back seat cushion are compressed and such compressive movement automatically alters the volumetric capacity of some of the cylindrical recesses 17 within the bottom cushion 14 and back seat cushion. Thus, air is forced out of such cylindrical recesses 17 through the openings 19. Furthermore, as the bottom cushion 14 and the back rest cushion are relieved of such compressive forces they expand and fresh air is drawn through the relatively small apertures 24 which provide fluid communication between the exterior of the cushion and the cylindrical recesses 17. The apertures 24 serve as air inlet means for the pump means. Hence, a positive pumping or circulation of air is achieved.

The embodiments of the invention chosen for the purposes of illustration and description herein are those preferred for achieving the objects of the invention and developing the utility thereof in a most desirable manner due regard being had to existing factors of economy, simplicity of design and construction, manufacturing methods and the improvements sought to be effected.

It will be appreciated therefore that the particular structural and functional aspects emphasized herein are not intended to exclude but rather to suggest such other adaptation and modifications of the invention as fall within the spirit and scope of the invention as defined in the appended claims.

What is claimed is:

1. A seat construction comprising a relatively rigid and thin metal base member having a plurality of spaced apertures formed therethrough; a resiliently compressible, rubber-like cushion having one surface thereof abutting said base member so as to be supported thereby, said cushion having a plurality of spaced openings formed therein and opening into a surface thereof spaced from said cushion surface abutting said base member, said cushion further having a plurality of elongated cylindrical recesses formed therein extending from said cushion surface abutting said base member to said openings, each of said cylindrical recesses being associated and in axial alignment with a respective one of said openings so as to provide fluid communication between the exterior of said cushion and the interior spaces defined by the cylindrical recess, each of said interior spaces defined by a respective cylindrical recess also being in fluid communication with the exterior of said base member through certain of said apertures, each of said cylindrical recesses decreasing in volumetric capacity as said cushion is being compressed whereby air under pressure is emitted from said cushion through said openings during compression of said cushion, said apertures serving as air inlet means for said cylindrical recesses upon expansion of said cushion, the diameter of each of said cylindrical recesses being substantially uniform throughout its length when said cushion is in its fully uncompressed state, and the area of the opening associated with each cylindrical recess being greater than the total area afforded by the apertures associated with such cylindrical recess.

2. A seat construction comprising a relatively thin metal base member having a plurality of longitudinally and transversely spaced apertures formed therethrough; a substantially solid, relatively thick and resiliently compressible cushion having one surface thereof abutting said base member so as to be supported thereby, said cushion being formed to provide thickened portions along its transversely spaced sides and its normally forwardmost edge, said cushion having a plurality of longitudinally and transversely spaced openings formed therein opening into an uppermost surface thereof, said uppermost surface of said cushion being disposed inwardly of said thickened side and front portions, said cushion further having a plurality of elongated cylindrical recesses formed therein extending substantially vertically from said lowermost surface of said cushion abutting said base member to the lowermost ends of said openings, each of said cylindrical recesses being associated and in axial alignment with a respective one of said openings so as to provide fluid communication between the exterior of said cushion and the interior space defined by the cylindrical recess, the interior space defined by each cylindrical recess also being in fluid communication with the exterior of said base member through certain of said apertures, the area of the opening associated with each cylindrical recess being greater than the total area afforded by the apertures associated with such cylindrical recess, the volumetric capacity of each of said cylindrical recesses decreasing in accordance with the extent said cushion is compressed whereby air under pressure is emitted from said openings during compression of said cushion, said apertures serving as air inlet means for said cylindrical recesses to permit filling of the same upon expansion of said cushion; and cover means extending from the peripheral edges of said base member for enclosing the exposed surface of said cushion, said covering means including a sheet of woven fabric material secured to said uppermost surface of said cushion disposed between said thickened transverse side and forward portions, said woven fabric sheet having a plurality of apertures formed therethrough, each of said apertures being in registration with and of substantially the same area as a respective one of said openings.

3. A seat construction as set forth in claim 2, wherein said covering means further includes a fabricated strip of synthetic rubber material having a substantially U-shape when viewed in plan, said synthetic rubber strip having an edge thereof secured to marginal edge portions of said base member and extending over said side and forwardmost thickened portions, said strip having edges secured to marginal edges of said woven fabric sheet.

4. A seat construction as set forth in claim 2, wherein said covering means further includes a vinyl plastic cover having an edge thereof secured to marginal edges of said base member, said vinyl plastic cover extending over said side and forwardmost thickened portions and said uppermost surface of said cushion into which said openings open, said woven fabric sheet being secured to said vinyl plastic cover, said vinyl plastic cover having a plurality of apertures therein, each of said apertures being registerable with and of substantially the same area as a respective one of said apertures formed in said woven fabric sheet.

References Cited

UNITED STATES PATENTS

| 2,012,042 | 8/1935 | Gerlofson et al. | 297—453 X |
| 2,760,562 | 8/1956 | Fisher | 5—355 |
| 2,978,972 | 4/1961 | Hake | 297—453 X |

FOREIGN PATENTS

| 1,353,796 | 1/1964 | France. |

DAVID J. WILLIAMOWSKY, *Primary Examiner.*

FRANK B. SHERRY, *Examiner.*

A. CALVERT, *Assistant Examiner.*